(12) United States Patent
Uehara

(10) Patent No.: US 10,185,602 B2
(45) Date of Patent: Jan. 22, 2019

(54) INFORMATION PROCESSING APPARATUS, INFORMATION PROCESSING METHOD, AND COMPUTER PROGRAM PRODUCT

(71) Applicant: Noriyuki Uehara, Kanagawa (JP)

(72) Inventor: Noriyuki Uehara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 292 days.

(21) Appl. No.: 15/067,896

(22) Filed: Mar. 11, 2016

(65) Prior Publication Data

US 2016/0274958 A1    Sep. 22, 2016

(30) Foreign Application Priority Data

Mar. 18, 2015  (JP) ................. 2015-055437

(51) Int. Cl.
G06F 9/54    (2006.01)

(52) U.S. Cl.
CPC .................... G06F 9/542 (2013.01)

(58) Field of Classification Search
CPC ........................................................ G06F 9/542
See application file for complete search history.

(56) References Cited

U.S. PATENT DOCUMENTS

| 8,161,366 B2* | 4/2012 | Pothireddy | G06F 11/28 714/814 |
| 2010/0030939 A1* | 2/2010 | Litovtchenko | G06F 9/4812 710/263 |
| 2011/0055406 A1* | 3/2011 | Piper | G06F 9/5077 709/227 |
| 2012/0084245 A1* | 4/2012 | Law | H04L 45/742 706/47 |
| 2012/0304185 A1 | 11/2012 | Horikawa | |
| 2013/0325842 A1* | 12/2013 | Asai | G06F 17/30501 707/716 |

FOREIGN PATENT DOCUMENTS

| JP | 2006-081669 | 1/2006 |
| JP | 2009-157751 | 7/2009 |
| JP | 2010-026575 | 2/2010 |
| WO | 2011/096163 | 8/2011 |

* cited by examiner

*Primary Examiner* — Charles E Anya
(74) *Attorney, Agent, or Firm* — Oblon, McClelland, Maier & Neustadt, L.L.P.

(57) ABSTRACT

An information processing apparatus includes a first memory, a determiner, and a controller. The first memory stores therein a current state of a system running on the information processing apparatus and a target state that is a post-transition state of the system. The determiner determines, upon receiving, from an event notifier, an event notice indicating that a condition for making transition to a specific state is satisfied, whether the current state and the target state match. The controller performs exclusive control when the determiner determines that the current state and the target state of the system do not match, the exclusive control preventing the system from making transition to the specific state.

11 Claims, 7 Drawing Sheets

FIG.7

| CURRENT STATE | TRANSITIONABLE STATE | |
|---|---|---|
| a | b | d |
| b | a | c |
| c | b | |
| d | a | |

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2015-055437 filed in Japan on Mar. 18, 2015.

BACKGROUND OF THE INVENTION

1. Field of the Invention

The present invention relates generally to an information processing apparatus, an information processing method, and a computer program product.

2. Description of the Related Art

During state transition of a system, the system is placed in a transient state where the system is in neither a pre-transition state nor a post-transition state. For this reason, a state transition request submitted when state transition is in progress can cause abnormal state transition to occur. To prevent this, it is known to perform exclusive control when state transition is in progress, thereby not accepting a state transition request until completion of the state transition. To perform such exclusive control as that described above, a technique for determining whether state transition of a system needs to be made exclusively is proposed. An example of this technique is disclosed in Japanese Laid-open Patent Application No. 2009-157751 (Patent Document 1).

However, as the system size increases, a state transition diagram becomes more complicated, making exclusive control also more complicated. Hence, there is a problem that the possibility of occurrence of deadlock undesirably increases with each addition of a new state. The technique disclosed in Patent Document 1 cannot solve this problem.

Therefore, there is a need to provide an information processing apparatus, an information processing method, and a computer program product that are capable of reducing occurrence of deadlock.

SUMMARY OF THE INVENTION

It is an object of the present invention to at least partially solve the problems in the conventional technology.

According to an embodiment, an information processing apparatus includes a first memory, a determiner, and a controller. The first memory stores therein a current state of a system running on the information processing apparatus and a target state that is a post-transition state of the system. The determiner determines, upon receiving, from an event notifier, an event notice indicating that a condition for making transition to a specific state is satisfied, whether the current state and the target state match. The controller performs exclusive control when the determiner determines that the current state and the target state of the system do not match, the exclusive control preventing the system from making transition to the specific state.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of a state transition table;

DETAILED DESCRIPTION OF THE PREFERRED EMBODIMENTS

Exemplary embodiments of the present invention are described in detail below with reference to the accompanying drawings. The present invention is not intended to be limited to the embodiments. Components of the embodiments include what may be termed equivalents thereof, those substantially identical thereto, and those that will readily occur to those skilled in the art. One or more of the components may be omitted, replaced, modified, and combined in various ways without departing from the scope of the embodiments.

(Hardware Structure of Information Processing Apparatus)

Figure 1:
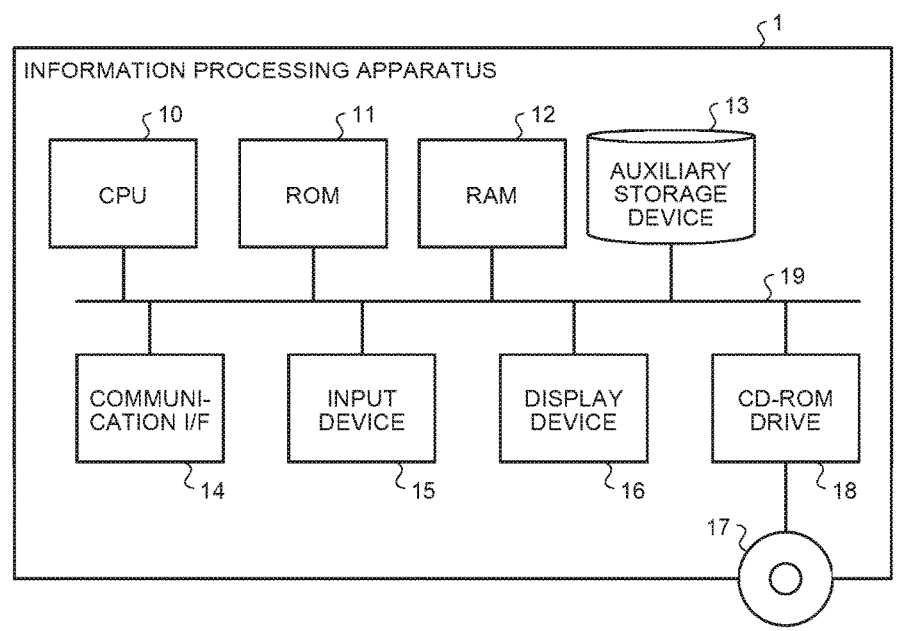
FIG. 1 is a block diagram illustrating an example hardware structure of an information processing apparatus according to an embodiment.

FIG. 1 is a block diagram illustrating an example hardware structure of an information processing apparatus according to an embodiment. The hardware structure of an information processing apparatus 1 of the present embodiment is described below with reference to FIG. 1.

As illustrated in FIG. 1, the information processing apparatus 1 includes a CPU (central processing unit) 10, a ROM (read only memory) 11, a RAM (random access memory) 12, an auxiliary storage device 13, a communication I/F 14, an input device 15, a display device 16, and a CD-ROM (compact disc read only memory) drive 18. The above-described components are connected via a bus 19 in a manner that allows mutual data communication.

The CPU 10 is a computing device controlling operations of components of the information processing apparatus 1. The ROM 11 is a nonvolatile storage device storing program instructions (hereinafter, "program") to be executed by the CPU 10 to control various functions. The RAM 12 is a volatile storage device functioning as a work area of the CPU 10 and the like.

The auxiliary storage device 13 is a nonvolatile storage device accumulating and storing various data including the program to be executed by the CPU 10 and the like. The auxiliary storage device 13 is a storage device, such as an HDD (hard disk drive), an SSD (solid state drive), a flash memory, or an optical disk, capable of electrically, magnetically, or optically storing data.

The communication I/F 14 is an interface for communication with external equipment via a network, such as a LAN (local area network), a wireless network, or the like. The communication I/F 14 may be implemented in a communication device, such as an NIC (network interface card). The communication I/F 14 may be an interface compliant with, for example, Ethernet (registered trademark), such as 10Base-T, 100Base-TX, or 1000Base-T.

The input device 15 is a device accepting an input entered by a user to cause the CPU 10 to execute predetermined processing. The input device 15 may be implemented in, for example, a mouse, a keyboard, a numeric keypad, a touch pad, or an operation input function provided by a touch panel.

The display device 16 is a device for displaying an image of application software (hereinafter, "application") or the like executed by the CPU 10. The display device 16 may be a CRT (cathode ray tube) display, a liquid crystal display, a plasma display, or an organic EL (electroluminescent) display, for example.

The CD-ROM drive 18 is a device controlling reading and writing data from and to a CD-ROM 17, which is an example of a removable storage medium. Other examples of the removable storage medium include computer-readable recording media including a CD-R (compact disc recordable), a DVD (digital versatile disk), and a Blu-ray Disc.

The above-described program to be executed by the CPU 10 may be distributed as being recorded in a non-transitory, computer-readable recording medium as an installable- or executable-format file. Examples of the recording medium include a CD-ROM (compact disc read only memory) and an SD memory card (secure digital memory card).

(Block Configuration of Information Processing Apparatus)

Figure 2:
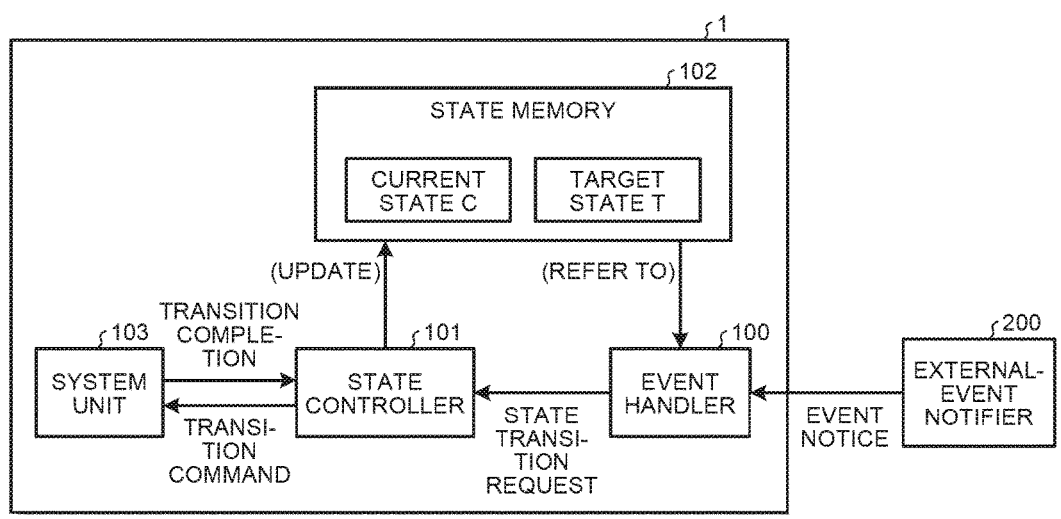
FIG. 2 is a diagram illustrating an example of a functional block configuration of the information processing apparatus according to the embodiment.

FIG. 2 is a diagram illustrating an example of a functional block configuration of the information processing apparatus according to the embodiment. The functional block configuration of the information processing apparatus 1 is described below with reference to FIG. 2.

As illustrated in FIG. 2, the information processing apparatus 1 includes an event handler 100 ("determiner"), a state controller 101 ("controller"), a state memory 102 (an example of "first memory" and "second memory"), and a system unit 103.

The event handler 100 is a functional component that determines, when an event notice indicating that a condition for making transition of the system unit 103 to a specific state is satisfied is received from an external-event notifier 200 (an example of "event notifier"), whether a current state of the system unit 103 (hereinafter, sometimes referred to as "current state") and a post-transition state of the system unit 103 (hereinafter, sometimes referred to as "target state") match. Furthermore, when it is determined that the current state of the system unit 103 and the target state match, the event handler 100 sends a state transition request requesting that the system unit 103 should make transition to the specific state in accordance with the received event notice to the state controller 101.

The state controller 101 is a functional component that sends, upon receiving the state transition request from the event handler 100, a transition command to perform a transition operation of bringing the state of the system unit 103 to the specific state to the system unit 103. Furthermore, upon receiving the state transition request, the state controller 101 updates a current state C, which is described later, stored in the system unit 103 to the specific state indicated by the state transition request. When the transition operation of the system unit 103 to the specific state ends, the state controller 101 updates a target state T, which is described later, stored in the system unit 103 to the specific state. Furthermore, if the state controller 101 does not receive a state transition request from the event handler 100 even though the information processing apparatus 1 has received an event notice from the external-event notifier 200, the state controller 101 performs exclusive control of not causing state transition of the system unit 103 to occur. The event handler 100 may be configured such that, if it is determined that a state transition request is not to be sent to the state controller 101 on the basis of an event notice, the event handler 100 explicitly sends an exclusion control request for causing the state controller 101 to perform exclusive control.

The state memory 102 is a functional component storing information about the current state and the target state of the system unit 103 as the current state C and the target state T, respectively, as illustrated in FIG. 2. The state memory 102 may be implemented in the RAM 12 or the auxiliary storage device 13 illustrated in FIG. 1, for example.

The system unit 103 is a system for executing specific processing implemented in the program executed by the CPU 10 illustrated in FIG. 1. The system unit 103 can be placed in a specific state as indicated by a state transition diagram and the like, which will be described later. Upon receiving a transition command to perform a transition operation to a specific state from the state controller 101, the system unit 103 performs the transition operation to the specific state. When the transition operation ends, the system unit 103 sends a transition completion notice indicating that the transition operation to the specific state is completed to the state controller 101. The specific state where the system unit 103 can be placed is, for example, in a case where the system unit 103 is an application for measuring a certain physical quantity, each of "measurement of the physical quantity is in progress" state, "measurement of the physical quantity is on pause" state, and "measurement of the physical quantity is on stand-by" state.

The external-event notifier 200 is a functional component that transmits an event notice indicating that a condition for making transition of the system unit 103 to a specific state is satisfied to the information processing apparatus 1. Although the external-event notifier 200 is depicted as a functional component external to the information processing apparatus 1 in FIG. 2, the external-event notifier 200 may alternatively be an inner functional component of the information processing apparatus 1. As the event notice, for example, a signal representing an operation entered by a user to the input device 15 for causing application, which is the system unit 103, to make transition to a specific state (e.g., in the example of the application software described above, transition from the "measurement of the physical quantity is on stand-by" state to the "measurement of the physical quantity is in progress" state) is transmitted to the event handler 100.

A part or all of the event handler 100 and the state controller 101 illustrated in FIG. 2 may be implemented in a hardware circuit rather than in program instructions, which are software.

The event handler 100, the state controller 101, and the state memory 102 are conceptual representations of functions, and their configurations are not limited to those described above. For example, the plurality of functional components illustrated as independent functional components in FIG. 2 may be configured as a single functional component. It is also possible to divide functions provided by a single functional component in FIG. 2 and configure the functions into a plurality of functional components.

(Expansion of Exclusion Control Section)

Figure 3:
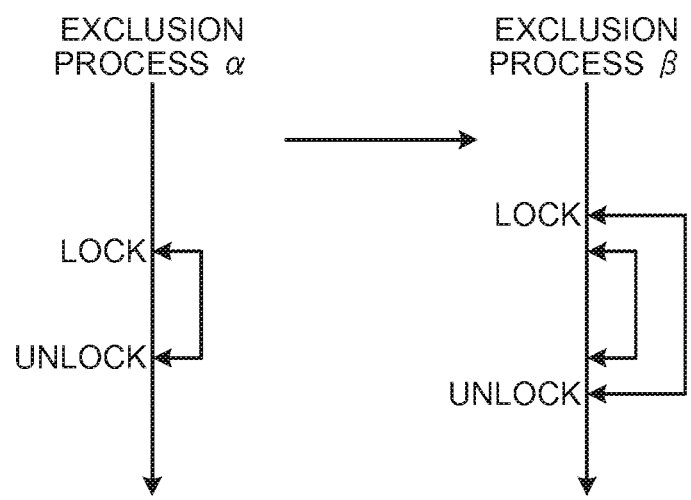
FIG. 3 is a diagram illustrating an example of expansion of an exclusive control section.
Figure 4:
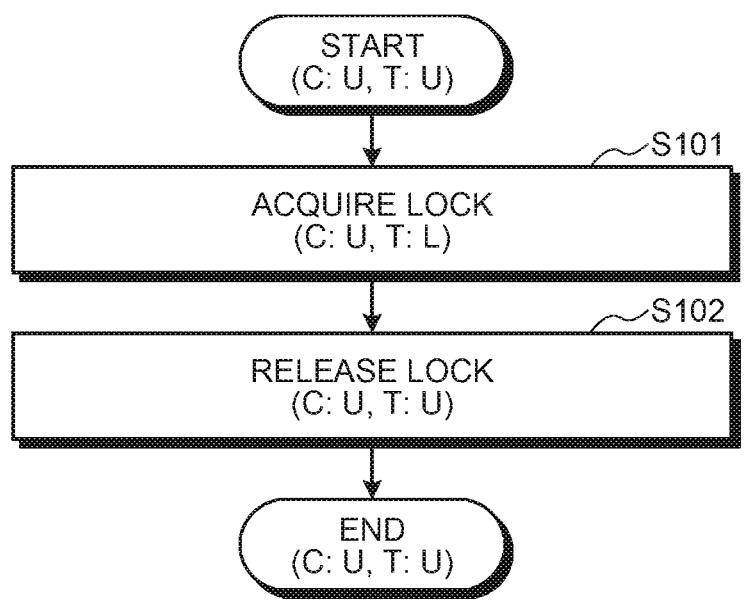
FIG. 4 is a flowchart illustrating an example of an exclusion process performed before the exclusive control section is expanded.
Figure 5:
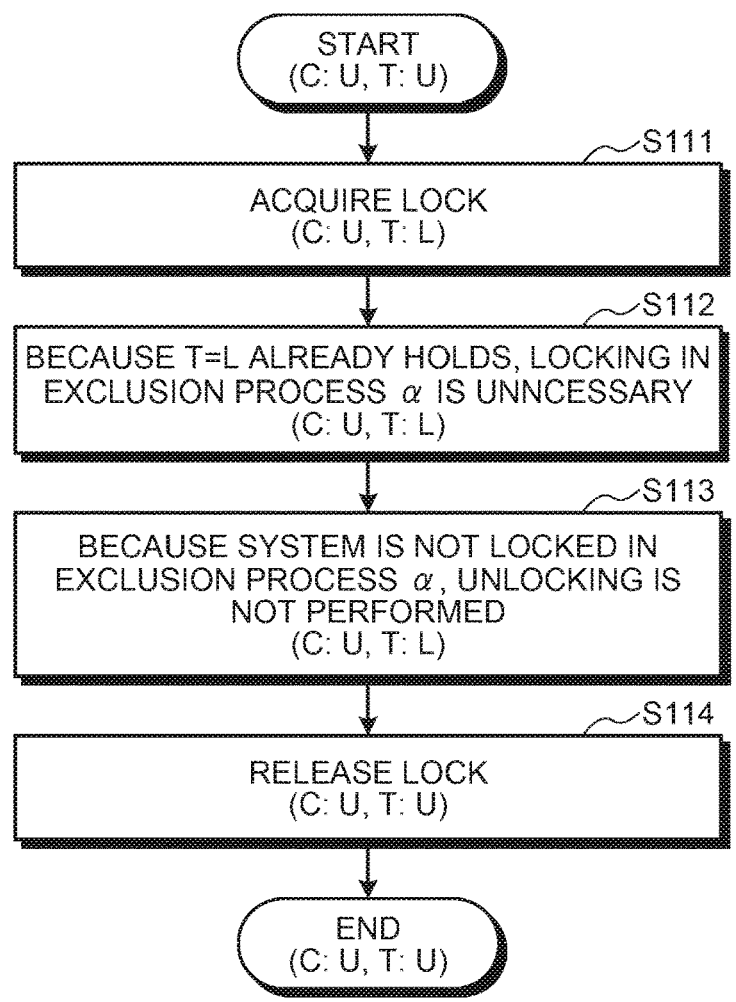
FIG. 5 is a flowchart illustrating an example of an exclusion process performed after the exclusive control section is expanded.

FIG. 3 is a diagram illustrating an example of expansion of an exclusive control section. FIG. 4 is a flowchart illustrating an example of an exclusion process performed before the exclusive control section is expanded. FIG. 5 is a flowchart illustrating an example of an exclusion process performed after the exclusive control section is expanded. The exclusion process performed before the exclusive control section is expanded and that performed after the section is expanded are described below with reference to FIGS. 3 to 5.

An exclusion process α performs exclusive control in a specific section as illustrated in FIG. 3. Specifically, the exclusion process α acquires a lock at a predetermined timing, thereby locking the system so that the system does not make transition the specific state. The exclusion process α that has locked the system unlocks or, put another way, releases the lock, when the specific section ends. The exclusion process α is described below with reference to FIG. 4 using the current state C and the target state T described above. It is assumed that before the specific section starts, the current state C and the target state T are unlocked states.

At S101, the exclusion process α acquires a lock at a predetermined timing (i.e., when the specific section starts), thereby locking the system so that the system does not make transition to the specific state. The exclusion process α updates the target state T to a locked state L (T: L). Because the current state C and the target state T do not match, the exclusion process α performs exclusive control. Processing moves to S102.

At S102, the exclusion process α that has locked the system unlocks the system or, put another way, releases the lock, when the specific section ends. Furthermore, the exclusion process α updates the target state T to an unlocked state U (T: U).

A situation where the specific section, in which exclusive control is to be performed, is expanded by an exclusion process β as illustrated in FIG. 3 is described below. In this situation, it is unnecessary to lock and unlock the system in the exclusion process α. If an acquired lock is deleted or the system is already placed in a locked state to avoid deadlock, the need of adding processing for preventing acquisition of a lock arises. The same applies to a situation where a section, in which exclusive control is to be performed (hereinafter, "exclusive control section"), is reduced.

Modifying processing each time an exclusive control section is changed as described above is troublesome and, furthermore, can be a cause of occurrence of deadlock. This problem is avoidable by employing the above-described concept of the current state C and the target state T of the system. Specifically, the exclusion process R performs exclusive control when the current state C and the target state T do not match. The exclusion process 1 performs no processing when the target state T to be changed is already set to an aimed state. The exclusion process R is described below using the current state C and the target state T with reference to FIG. 5. It is assumed that before the expanded exclusive control section starts, the current state C and the target state T are the unlocked states.

At S111, the exclusion process 1 acquires a lock at a predetermined timing (i.e., when the expanded exclusive control section starts), thereby locking the system so that the system does not make transition to the specific state. The exclusion process β updates the target state T to the locked state L (T: L). Processing moves to S112.

At Step S112, because the target state T is already updated to the locked state L by the exclusion process β, the exclusive process α performs no processing in contrast to a case where the exclusion process α is performed alone and updates the target state T to the locked state L. Processing moves to S113.

At S113, because the system is not locked at S112, the exclusive process α performs no processing in contrast to the case where the exclusion process α is performed alone and updates the target state T to the unlocked state U. Processing moves to S114.

At S114, the exclusion process R that has locked the system unlocks the system or, put another way, releases the lock, when the expanded exclusive control section ends. The exclusion process β updates the target state T to the unlocked state U (T: U).

The exclusion process β allows expanding or reducing an exclusive control section regardless of the exclusion process α in this manner, and therefore can reduce occurrence of deadlock.

(State Transition)

Figure 6:
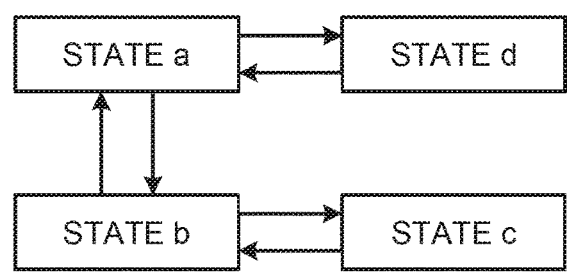
FIG. 6 is a diagram illustrating an example of a state transition diagram.

FIG. 6 is a diagram illustrating an example of a state transition diagram. FIG. 7 is a diagram illustrating an example of a state transition table. State transition in the system unit 103 is described below with reference to FIGS. 6 and 7.

It is assumed that the state of the system unit 103 of the information processing apparatus 1 according to the present embodiment makes transition in accordance with the state transition diagram illustrated in FIG. 6, for example. Specifically, the system unit 103 in a state a can make transition to any one of a state b and a state d. The system unit 103 in the state b can make transition to any one of the state a and a state c. The system unit 103 in the state c can make transition to the state b. The system unit 103 in the state d can make transition to the state a. Data representing a state transition table 1000, an example of which is illustrated in FIG. 7, is stored in the state memory 102, so that the event handler 100 can acquire information about a state(s), to which the system unit 103 can make transition.

(Concrete Operation of Exclusive Control)

Figure 8:
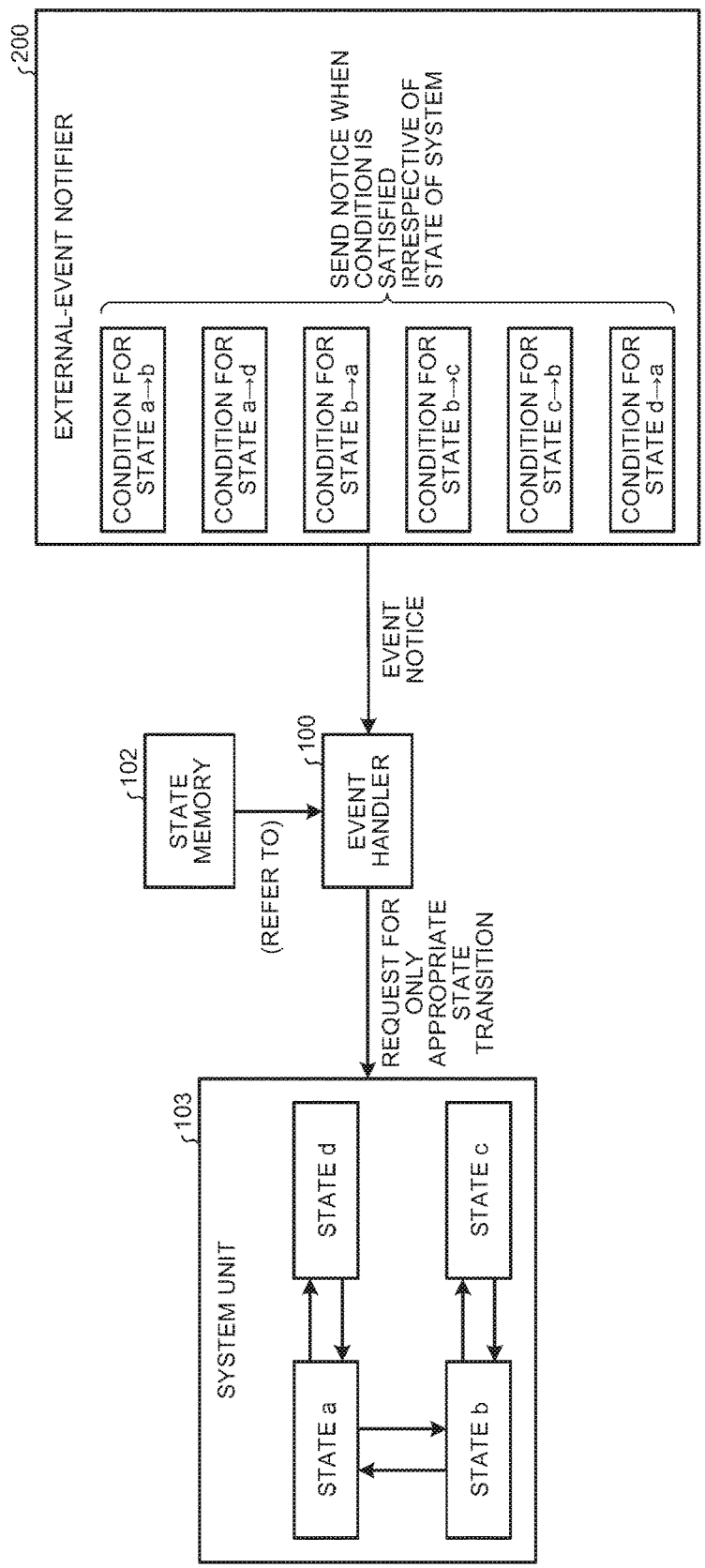
FIG. 8 is an explanatory diagram of a state transition operation performed in the information processing apparatus according to the embodiment.
Figure 9:
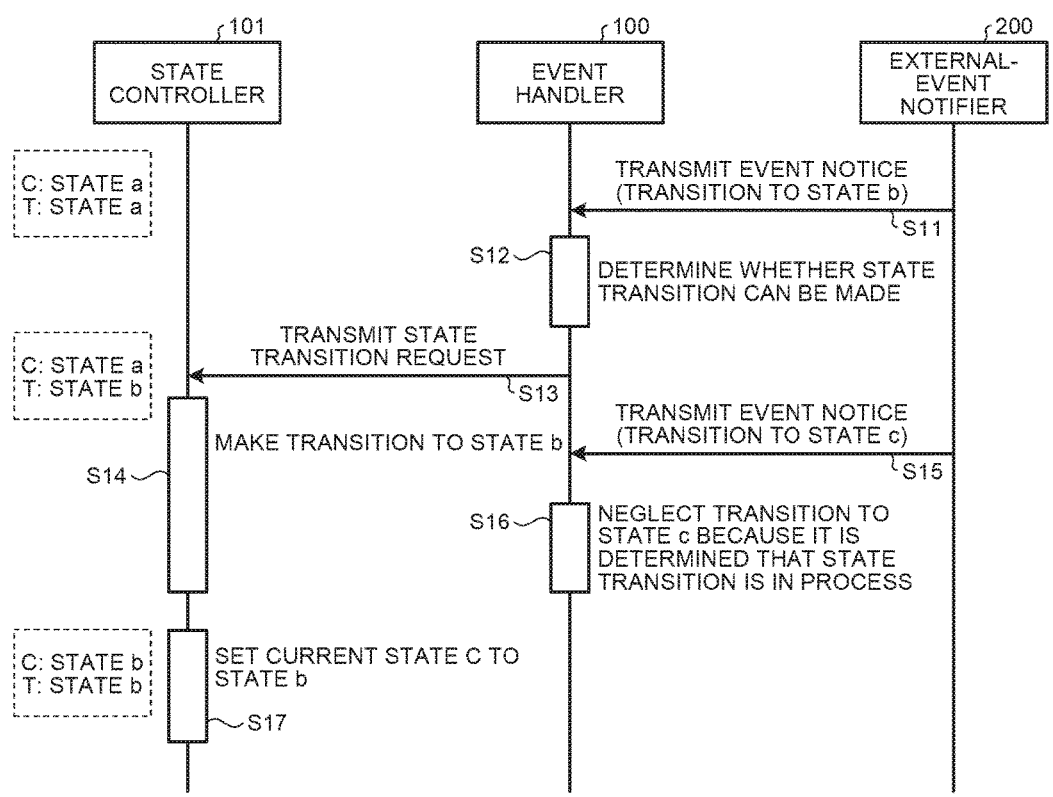
FIG. 9 is a sequence diagram illustrating an example of an exclusive control operation performed when state transition in the information processing apparatus according to the embodiment is in progress.
Figure 10:
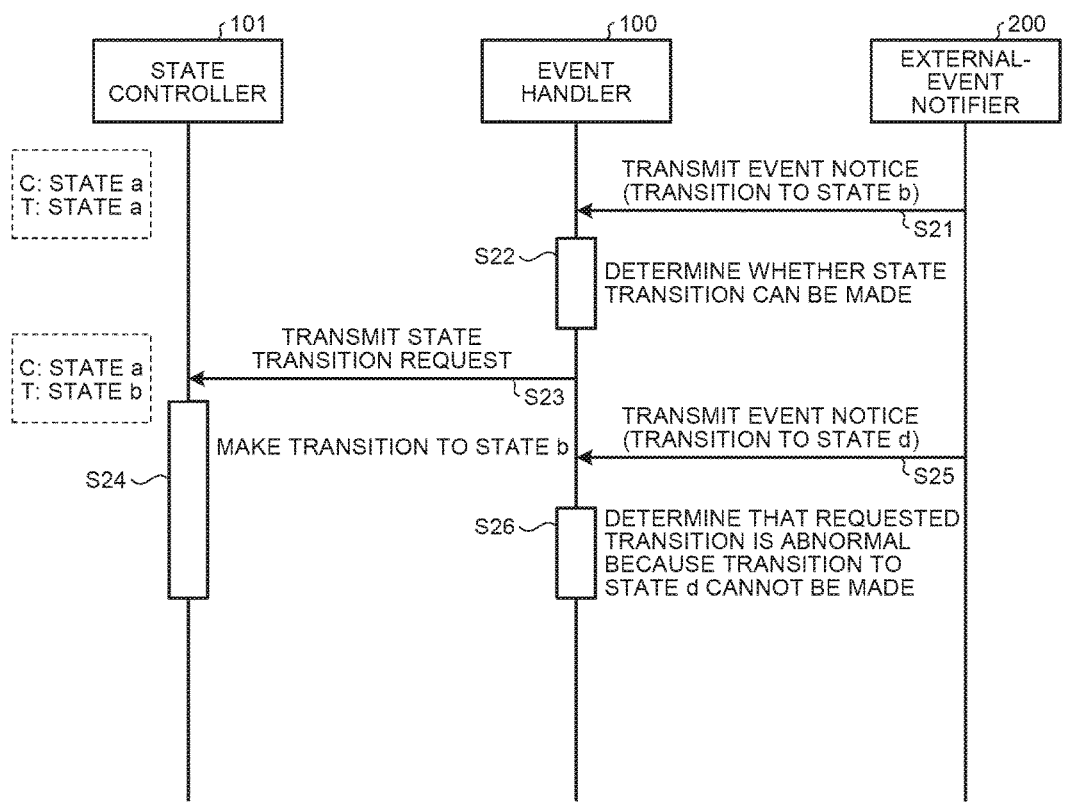
FIG. 10 is a sequence diagram illustrating an example of an operation in a situation where an abnormal state transition request is received when state transition in the information processing apparatus according to the embodiment is in progress.

FIG. 8 is an explanatory diagram of a state transition operation performed in the information processing apparatus according to the embodiment. FIG. 9 is a sequence diagram illustrating an example of an exclusive control operation performed when state transition in the information processing apparatus according to the embodiment is in progress. FIG. 10 is a sequence diagram illustrating an example of an operation in a situation where an abnormal state transition request is received when state transition in the information processing apparatus according to the embodiment is in progress. A concrete operation of exclusive control performed in the information processing apparatus 1 according to the present embodiment is described below with reference to FIGS. 8 to 10.

As illustrated in FIG. 8, the system unit 103 can make state transition as illustrated in the state transition diagram of FIG. 6. As illustrated in FIG. 8, when any one of a condition for making transition from the state a to the state b, d, a condition for making transition from the state b to the state a, c, a condition for making transition from the state c to the state b, and a condition for making transition from the state d to the state a is satisfied, the external-event notifier 200 transmits an event notice indicating that the condition is satisfied to the event handler 100 of the information processing apparatus 1 irrespective of the state of the system unit 103. Upon receiving the event notice, when it is determined that the current state and the target state of the system unit 103 match, the event handler 100 sends a state transition request requesting that the system unit 103 should make transition to a specific state in accordance with the received event notice to the state controller 101. For brevity of description, the state controller 101 is omitted from FIG. 8.

An operation to be performed when an event notice is issued from the external-event notifier 200 during state transition is described below through an example, in which an event notice indicating that the condition for making transition to the state c is satisfied is issued during a transition operation from the state a to the state b with reference to FIG. 9. Assumed initial states in this example are such that the current state C stored in the state memory 102 is the state a (i.e., the current state of the system unit 103 is the state a) and the target state T is the state a.

At S11, the external-event notifier 200 detects that the state of the system unit 103 satisfies the condition for making transition to the state b and transmits an event notice indicating that the condition is satisfied to the event handler 100 of the information processing apparatus 1.

At S12, upon receiving the event notice indicating that the condition for making transition to the state b is satisfied, the event handler 100 determines whether the system unit 103 can make transition to the state b. Specifically, the event handler 100 determines that the system unit 103 can make transition to the state b on the basis that both the current state C and the target state T are the state a and therefore match and, furthermore, that the system unit 103 can make transition from the state a to the state b by referring to the state transition table 1000 in the state memory 102.

At S13, the event handler 100 transmits a state transition request requesting that the system unit 103 should make state transition to the state b to the state controller 101.

At S14, upon receiving the state transition request, the state controller 101 updates the target state T of the system unit 103 to the state b indicated by the state transition request and sends a transition command to perform a transition operation to the state b to the system unit 103. The system unit 103 starts the transition operation from the state a to the state b in accordance with the transition command.

At S15, in a period when the system unit 103 is performing the transition operation to the state b, the external-event notifier 200 detects that the state of the system unit 103 satisfies the condition for making transition to the state c and transmits an event notice indicating that the condition is satisfied to the event handler 100.

At S16, upon receiving the event notice indicating that the condition for making transition to the state c is satisfied, the event handler 100 determines whether the system unit 103 can make transition to the state c. Specifically, the event handler 100 determines that the system unit 103 can make transition from the state b to the state c by referring to the state transition table 1000 in the state memory 102. However, because the current state C, which is the state a, and the target state T, which is the state b, do not match, the event handler 100 determines that state transition of the system unit 103 is in progress and neglects the event notice. For some type of the system unit 103, the event handler 100 may be configured not to neglect the event notice but postpone processing until the state transition completes.

At S17, when the transition operation of the system unit 103 ends and the state controller 101 is notified of completion of the transition from the system unit 103, the state controller 101 updates the current state C of the system unit 103 to the state b indicated by the state transition request.

Thus, when the current state C and the target state T compared against each other do not match, the event handler 100 determines that state transition of the system unit 103 is in progress and neglects the event notice or postpone processing. Accordingly, the need of adding a logic for neglecting the event notice and the need of adding, each time a state is added, a logic therefor are eliminated. Hence, occurrence of a trouble resulting from a logic error or logic missing can be reduced.

An operation to be performed when an event notice is issued from the external-event notifier 200 when state transition is in progress is described below through an example, in which an event notice indicating that the condition for making transition to the state d is satisfied is issued during a transition operation from the state a to the state b with reference to FIG. 10. Assumed initial states in this example are such that the current state C stored in the state memory 102 is the state a (i.e., the current state of the system unit 103 is the state a) and the target state T is the state a.

At S21, the external-event notifier 200 detects that the state of the system unit 103 satisfies the condition for making transition to the state b and transmits an event notice indicating that the condition is satisfied to the event handler 100 of the information processing apparatus 1.

At S22, upon receiving the event notice indicating that the condition for making transition to the state b is satisfied, the event handler 100 determines whether the system unit 103 can make transition to the state b. Specifically, the event handler 100 determines that the system unit 103 can make transition to the state b on the basis that both the current state C and the target state T are the state a and therefore match and, furthermore, that the system unit 103 can make transition from the state a to the state b by referring to the state transition table 1000 in the state memory 102.

At S23, the event handler 100 transmits a state transition request requesting that the system unit 103 should make state transition to the state b to the state controller 101.

At S24, upon receiving the state transition request, the state controller 101 updates the target state T of the system unit 103 to the state b indicated by the state transition request and sends a transition command to perform a transition operation to the state b to the system unit 103. The system unit 103 starts the transition operation from the state a to the state b in accordance with the transition command.

At S25, in a period when the system unit 103 is performing the transition operation to the state b, the external-event notifier 200 detects that the state of the system unit 103 satisfies the condition for making transition to the state d and transmits an event notice indicating that the condition is satisfied to the event handler 100.

At S26, upon receiving the event notice indicating that the condition for making transition to the state d is satisfied, the event handler 100 determines whether the system unit 103 can make transition to the state d. Specifically, the event handler 100 determines that the system unit 103 cannot make transition from the state b to the state d on the basis that the current state C, which is the state a, and the target state T, which is the state b, do not match and by referring to the state transition table 1000 in the state memory 102. Accordingly, the event handler 100 detects that state transition from the state b to the state d as indicated by the event notice indicating that the condition for making transition to the state d is satisfied is abnormal transition. In this case, the event handler 100 does not send a state transition request to the state controller 101. The event handler 100 may be configured to display indication that the event notice is requesting abnormal transition on the display device 16, for example.

Thus, when the current state C and the target state T compared against each other do not match and it is determined that transition from the target state T to a state indicated by an event notice cannot be made on the basis of the state transition table 1000, the event handler 100 can detect that the transition being requested is abnormal transition. Occurrence of deadlock can be reduced by performing the exclusive control of not causing state transition to occur by using the current state C and the target state T or, more specifically, when it is determined that state transition is in progress on the basis that the current state C and the target state T do not match as in the example illustrated in FIGS. 9 and 10.

A configuration, in which if the event handler 100 detects abnormal transition, transition of the system unit 103 to a specific state (e.g., an initial state of the system unit 103) is forcibly made to perform initialization, may be employed. With this configuration, the system unit 103 may possibly be recovered.

The event handler 100 may be configured so as not to cause state transition of the system unit 103 to occur when a state indicated by an event notice received from the external-event notifier 200 matches any one of the current state C and the target state T. The event handler 100 may be configured so as not to transmit a state transition request if, even though the current state C and the target state T match, it is determined that transition from the current state C to the state indicated by the event notice cannot be made according to the state transition table 1000. Also in this case, processing may be performed as in the above-described case where the event handler 100 detects abnormal transition.

When at least any one of the event handler 100 and the state controller 101 is implemented in program instructions, the program instructions to be executed by the information processing apparatus 1 may be provided as a computer program product recorded in a non-transitory computer-readable recording medium, such as a CD-ROM, a flexible disk (FD), a CD-R, or a DVD (digital versatile disk), as an installable file or an executable file.

The program instructions to be executed by the information processing apparatus 1 according to the embodiment may be configured to be stored in a computer connected to a network, such as the Internet, and provided by being downloaded via the network. The program instructions to be executed by the information processing apparatus 1 according to the embodiment may be configured to be provided or distributed via a network such as the Internet. The program instructions may be configured to be provided as being stored in a ROM or the like in advance.

The program instructions to be executed by the information processing apparatus 1 according to the embodiment may be configured as modules including at least any one of the above-described event handler 100 and the state controller 101. From a perspective of actual hardware, the CPU 10 reads out the program instructions from the above-described storage medium and executes them, thereby loading and generating the functional components into a main storage device.

According to an aspect of the present invention, occurrence of deadlock can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a memory configured to store a current state of a system running on the information processing apparatus and a target state of the system; and
   processing circuitry configured to:
   receive an event notice indicating that a condition for causing the system to make transition to a specific state is satisfied;
   determine, in response to receiving the event notice, whether the stored current state of the system matches the stored target state of the system;
   perform exclusive control when the stored current state of the system is determined as not matching the stored target state of the system, the exclusive control corresponding to preventing the system from making transition to the specific state; and
   when the stored current state of the system is determined as matching the stored target state of the system,
   determine whether the system is able to make transition to the specific state from the stored current state of the system or from the stored target state of the system, and
   perform the exclusive control when the system is determined as unable to make transition to the specific state from the stored current state of the system or from the stored target state of the system.

2. The information processing apparatus according to claim 1, wherein
   the memory is configured to store state transition information indicating state transition flows of the system, and
   the processing circuitry is further configured to:
   determine whether the system is able to make transition to the specific state on the basis of the state transition information; and
   perform a transition operation to cause the system to make transition to the specific state when the stored current state of the system is determined as matching the stored target state of the system and when the system is able to make transition to the specific state on the basis of the state transition information.

3. The information processing apparatus according to claim 2, wherein the processing circuitry is further configured to:
   perform the exclusive control when the stored current state of the system is determined as not matching the stored target state of the system and when the system is determined as unable to make transition from the stored target state to the specific state on the basis of the state transition information.

4. The information processing apparatus according to claim 3, wherein the processing circuitry is further configured to:
   perform the exclusive control and cause the system to make transition to a predetermined state when the system is determined as unable to make transition to the specific state on the basis of the state transition information.

5. The information processing apparatus according to claim 2, wherein the processing circuitry is further configured to:
perform the exclusive control when the stored current state of the system is determined as matching the stored target state of the system and when the system is determined as unable to make transition from the stored current state to the specific state on the basis of the state transition information.

6. The information processing apparatus according to claim 5, wherein the processing circuitry is further configured to:
perform the exclusive control and cause the system to make transition to a predetermined state when the system is determined as unable to make transition to the specific state on the basis of the state transition information.

7. An information processing method comprising:
receiving an event notice indicating that a condition for causing a system running on an information processing apparatus to make transition to a specific state is satisfied;
determining, by processing circuitry of the information processing apparatus, whether a stored current state of the system matches a stored target state of the system, the stored current state and the stored target state being stored in a memory of the information processing apparatus;
performing exclusive control when the stored current state of the system is determined as not matching the stored target state of the system, the exclusive control corresponding to preventing the system from making transition to the specific state; and
when the stored current state of the system is determined as matching the stored target state of the system,
determining whether the system is able to make transition to the specific state from the stored current state of the system or from the stored target state of the system, and
performing the exclusive control when the system is determined as unable to make transition to the specific state from the stored current state of the system or from the stored target state of the system.

8. A non-transitory computer-readable recording medium storing program instructions that, when executed by an information processing apparatus, cause the information processing apparatus to perform:
receiving an event notice indicating that a condition for causing a system running on the information processing apparatus to make transition to a specific state is satisfied;
determining whether a stored current state of the system matches a stored target state of the system, the stored current state and the stored target state being stored in a memory of the information processing apparatus;
performing exclusive control when the stored current state of the system is determined as not matching the stored target state of the system, the exclusive control corresponding to preventing the system from making transition to the specific state; and
when the stored current state of the system is determined as matching the stored target state of the system,
determining whether the system is able to make transition to the specific state from the stored current state of the system or from the stored target state of the system, and
performing the exclusive control when the system is determined as unable to make transition to the specific state from the stored current state of the system or from the stored target state of the system.

9. The information processing apparatus according to claim 1, wherein the processing circuitry is further configured to perform a transition operation to cause the system to make transition to the specific state when the stored current state of the system is determined as matching the stored target state of the system and when the system is determined as able to make transition to the specific state from the stored current state of the system or from the stored target state of the system.

10. The information processing apparatus according to claim 9, wherein the processing circuitry is further configured to update the target state stored in the memory to the specific state when the transition operation to cause the system to make transition to the specific state starts.

11. The information processing apparatus according to claim 9, wherein the processing circuitry is further configured to update the current state stored in the memory to the specific state when the transition operation to cause the system to make transition to the specific state ends.

* * * * *